Patented Feb. 5, 1946

2,394,000

UNITED STATES PATENT OFFICE 2,394,000

SYNTHETIC RESIN AND PROCESS OF MAKING SAME

Thomas Robert McElhinney, New Orleans, La., assignor to William J. Gibbens, Jr.

No Drawing. Application October 31, 1940,
Serial No. 363,738

20 Claims. (Cl. 260—9)

The present invention relates to a synthetic resin, the process of making the same, and the products made from said resin.

An object of the present invention is the production from ligno-cellulose material, such as bagasse, cornstalks, straw, wood and other plant material, and phenols, of a synthetic resinous material of a type related to, and capable of being substituted for, the phenol-aldehyde resins already known to the art.

A further object is the provision from this synthetic resin and suitable fillers, hardening agents, plasticizers and the like, of a heat-hardenable, fast flowing, quick-curing, molding compound.

In its broad concept this invention embraces the process of making a synthetic resin similar to phenol-aldehyde resins which comprises reacting phenol with a ligno-cellulose material treated in a manner and under such conditions as to liberate aldehydes and ketones therefrom for combination with phenol. The product resulting from or produced by, or identified with the process has superior qualities and can be made at a comparatively low cost.

The use of ligno-cellulosic materials in the manufacture of synthetic resins and molding compounds is not broadly new and it is recognized that many patents have been granted and many articles written on the subject. However in the prior art an effort has been made to use the ligno-cellulose, cellulose, or lignin in its entirety. As a consequence, the resin produced has been, in one case, a very large molecule of cellulose-lignin-phenol lacking in flow quality, a solution of cellulose in phenol with the same lack of flow property, or a phenol-aldehyde resin contaminated with acids, non-curing cresols, and coke, or in the other case, a non-curing or slow-curing combination of ligno-cellulose and aniline and furfural. None of these compounds have been commercially satisfactory for molding.

Now it is well-known that ligno-cellulosic plant materials, such as bagasse, cornstalks, wood, straws, etc., are composed of cellulose, a carbohydrate having both alcoholic and aldehydic reactions, lignin, a natural resinous material as separated from the other constituents, and hemicelluloses, consisting largely of pentosans which are easily hydrolyzed to produce furfural. The plant material, in its entirety, may be so treated as to produce furfural, acetaldehyde, formaldehyde and ketones, all of which will react with phenols to produce the well-known class of synthetic resins known as phenol-aldehydes. It has been the object of this work to react phenol and ligno-cellulosic material together under such conditions that the above-named aldehydes and ketones will be released from the plant material and combined with the phenol in such a manner that a phenol-aldehyde type of resin is obtained. Specifically, the aldehydes and ketones are released from the plant material by means of acid-hydrolysis and are allowed to react with the phenol under conditions favoring the formation of a Novolak type of resin, both reactions proceeding simultaneously. Subsequently, the Novolak is used as is; or is converted to a curing type of resin and mixed with fillers, plasticizers, etc., to form a thermo-setting molding compound. Specific examples of preparation are given below the parts given being parts by weight unless otherwise indicated. It is to be understood that these conditions may be varied somewhat.

*Example 1.*—1000 parts dry bagasse and 1000 parts of phenol in which 50 parts of concentrated sulfuric acid has been reacted and melted are placed in a rotating digester and digested with live steam at 225 pounds per square inch pressure for 30 minutes. The digester is then quickly blown down and the contents dumped into a suitable receiver. The product, a shiny, black, Novolak resin, is preferably agitated and washed twice with small amounts of water. The wash waters, cook liquor, and blow down condensate are combined and saved for subsequent recovery of valuable acids and alcohols formed as by-products and a small amount of almost pure cellulose remaining from the bagasse. The resin is dried by heating to 300°–400° F., preferably with continuous agitation or passage between heated rollers. The final product is a lustrous black resin, almost completely soluble in acetone and other resin solvents, hard at room temperatures, and incapable of being permanently hardened even with prolonged heating. This material is suitable for a varnish ingredient, or as a binder for use in molding compounds. The yield of resin is approximately 118 to 124 per cent of the phenol.

*Example 2.*—3000 parts of the Novolak resin from Example 1, 300 parts commercial phenol, 66 parts sodium hydroxide dissolved in a small amount of water, and 900 parts commercial Formalin solution are placed in a steam jacketed reaction kettle equipped with a stirring device and boiled under reflux for from ½ to 2 hours. At the end of this time, vacuum is applied and about 450 parts of water are distilled off as rapidly as possible. (Most of the formaldehyde is also recovered during this distillation. It was present merely to aid as a solvent to assist in the neutralization of the sulfuric acid still present in the resin.) The contents of the kettle are quickly dumped and allowed to cool. The cooled material is a black or dark brown semi-solid resin, partially soluble in acetone and capable of being hardened to an infusible, insoluble material by further heating.

*Example 3.*—3000 g. of Novolak resin, prepared as in Example 1 with the use of phenol, 200 to 500 g. cresylic acid, the amount depending upon the flow required, 30 to 70 g. sodium hydroxide or molecular equivalent of ammonium hydroxide, potassium hydroxide, or double molecular equivalents of carbonates, oxides or hydroxides of heavy metals, and an amount of commercial Formalin solution sufficient to render the mixture fluid and to lower the boiling point of the mixture below 240° F., ordinarily about 900 cc. of solution, are placed in a steam-jacketed kettle equipped with a stirring device and a reflux condenser and heated at boiling for from ½ to 2 hours, with constant agitation. Steam is then shut off, the kettle connected to a condenser and receiving tank, and the water and excess formaldehyde is distilled off under vacuum, distillation being continued until the resin is substantially dry, preferably without further addition of heat. The contents of the kettle are quickly dumped and spread out in a thin layer to cool. The product is similar to that of Example 2, but possesses a higher degree of flow, due to the formation of non-curable and slowly-curable resins from the ortho- and para-cresol present in the cresylic acid. These resins act as plasticizers in the final molding compound. The product of this example may be used interchangeably with that of Example 2, but does not ordinarily require the addition of any other plasticizer. Choice of use depends upon whether or not a completely curable resin is desired in the final molded article.

*Example 4.*—Preparation of hot molding compound. The product of Example 2 is placed on mixing rolls heated to not more than 150° F., and compounded (100 parts resin) with 100 parts filler (bagasse and/or hydrolyzed bagasse, and/or alkaline-digested bagasse, etc.), 4 parts hexamethylenetetramine, 2 parts calcium hydroxide, and 2 to 5 parts of a suitable plasticizer such as glycerol, monochloronaphthalene, chlorinated phenols, castor oil, a high-boiling mixed glycolester of the type commonly designated as Santicizers, or a permanently fusible phenol-formaldehyde resin. Total time of mixing should not exceed 5 minutes and care should be taken that the temperature does not rise above 150°, since the reaction is exothermic. The completed mixture is ground to pass a 16-mesh screen and is then ready for use as a molding compound. The material may be molded at pressures of about one ton per square inch and requires from one-half to five minutes curing time at temperatures between 300 and 340° F., depending upon temperature, pressure and thickness.

*Example 5.*—Preparation of hot molding compound. 100 parts of the product of Example 2 is placed on mixing rolls, heated to not more than 150° F. and compounded with 100 parts of a filler comprising bagasse which has been digested for one hour at 100 pounds steam pressure with a 10% milk of lime solution, washed, and beaten in a Hollander or other beater until separation of fibers has been obtained, 4 parts hexamethylenetetramine, 2 parts calcium hydroxide, and 2–4 parts of a suitable plasticizer, such as glycerol, monochloronaphthalene, chlorinated phenols, castor oil, a high-boiling mixed glycolester of the type commonly designated as Santicizers, or a permanently fusible phenol-formaldehyde resin. Total time of mixing should not exceed 5 minutes, and care should be taken that the temperature does not rise above 150° F., in order to prevent pre-curing. The completed mixture is ground to pass a 16-mesh screen and is then ready for use as a molding compound. The material may be molded at pressures at about one ton per square inch and requires from one-half to five minutes curing time at temperatures between 300 and 340° F., depending upon temperature, pressure and thickness. The resulting product may be ejected hot from the mold and is a hard shiny-black, moisture resistant, infusible mass, possessing unusual high mechanical strength.

*Example 6.*—Preparation of a hot molding compound. 100 parts of Novolak resin from Example 1, 4 parts of calcium hydroxide, 4 parts of hexamethylenetetramine, and 2 parts of zinc stearate are ground together in a ball mill until thoroughly mixed. 100 parts of filler are added and mixing continued until the mixture is homogeneous. The resulting mixture is suitable for use as a molding compound or may be sheeted on hot differential rolls and granulated before molding. This method is simpler and somewhat less expensive than the method described in Example 2, and is preferable where an extremely low-cost molding compound is desired. The molding compound formed is not as strong and does not have quite as good flow properties as that prepared by the method given in Example 5.

*Example 7.*—100 parts of Novolak resin prepared as in Example 1, 6 parts calcium hydroxide, 4 parts of hexamethylenetetramine, and 2 parts of zinc stearate are ground together in a ball mill until thoroughly mixed, 25 parts of long, fibrous material prepared by digesting bagasse with a 10% milk of lime solution as described in Example 5 are added and mixed for ten minutes. To this mixture is added 100 parts of molding compound prepared by digesting bagasse with 1% of sulfuric acid and mixing the dried ground material with 8% by weight aniline and an equal amount of furfural, and ball milling is continued until the product is homogeneous. The resulting material can be used as a molding material directly but is preferably granulated as described in Example 4. Articles molded from the above described material have an unusual degree of luster and are very high in water resistance, but are somewhat more brittle than material made as in Example 5.

In the examples from 1 to 7 inclusive the reactants are given in preferred quantities and the following data is given to show a broader range of the variables.

In Example 1 the proportions of the reactants now stated are the present preferred quantities. However, this reaction proceeds satisfactorily under fairly wide ranges of conditions, provided that any changes in the procedure in Example 1 are compensated for in the procedure under Example 2, etc. For instance, using 1000 parts dry bagasse as a base (this bagasse does not have to be dry as long as the moisture content is known and corrected for), the proportions of phenol may be varied from 500 to 1500 parts (1000 parts giving greatest economy on a yield basis), the sulfuric acid may vary from 30 to 75 parts of concentrated acid, although 50 parts are preferred as giving a more easily controlled reaction than higher proportions, while much smaller proportions require longer reaction periods or higher steam pressures. Time may be varied from 10 minutes to 5 or 6 hours, depending upon phenol and acid concentrations and steam pressures used. Steam pressures may be varied from 175 lbs., or less, to 300 lbs., but lower pressures require more time or more acid and higher pressures have a tendency to cause excessively violent reactions or coking of the product unless time is very carefully controlled.

In Example 2, using 3000 parts Novolak resin as a base, the phenol used may vary from none to any amount desired, providing that for every part phenol used approximately ½ part commercial Formalin solution (one-half the theoretical consumption by phenol) is added to the mix. The phenol is not essential to the reaction and in this case is added as a solvent for the Novolak resin, although it probably also improves the product. Experiments show that 10% is ample to render the Novolak sufficiently fluid for easy stirring and good mixing. Formaldehyde solution is present because of its solvent action on the Novolak resin, to reduce the boiling point of the solution, and to add the small amount of additional aldehyde needed to form a curable resin. Proportions of sodium hydroxide may vary from 1% (30 parts) of the Novolak resin to as much as 10%. However, 66 parts (2% of the combined resin and phenol) is sufficient to cause the reaction to complete itself in a reasonable time and larger amounts have a tendency to prematurely harden the resin and cause difficulty in dumping the finished product. This is contrary to the usual solvent action of sodium hydroxide in the preparation of phenol-aldehyde resins.

Example 3 is not subject to much change.

In Example 4, using 100 parts resin as a base, filler proportions may be varied from 50 to 150 parts, hexamethylenetetramine from 4 to 7 parts, and plasticizer from 2 to 5 parts depending on flow desired and the nature of the plasticizer. The proportions of calcium hydroxide are not subject to much variation, but molecular equivalents of barium hydroxide, magnesium, and other hydroxides, oxides, or basic carbonates may be substituted.

In Example 5, the filler content may vary from 75 to 100 parts, and hexamethylenetetramine from 4 to 7 parts.

In Example 6, from 4 to 7 parts hexamethylenetetramine and 75 to 150 parts of filler are the only changes.

Example 7 is not subject to much change.

It is to be understood that the invention is not specifically limited to the variations indicated for the examples.

With reference to the bases used in the reactions, ammonia and potassium hydroxide can be used in molecular equivalents of the sodium hydroxide, as well as basic carbonates of sodium and potassium. Oxides, hydroxides and carbonates of heavy alkaline earth metals such as barium, calcium and magnesium may be used in twice the molecular equivalents. Bases are indicated as dry weight, preferably dissolved in the least amount of water possible when used.

With reference to the acids used in the reactions, they are all concentrated.

Furfural and other aldehydes may be used instead of formaldehyde, but formaldehyde is preferred.

Various modifications of this invention will be apparent to those skilled in the art without departing from the merits thereof and it is therefore desired to be limited only by the scope of the appended claims.

What is claimed is:

1. A process of making a synthetic Novolak type of resin of a type similar to phenol-aldehyde resins which comprises, reacting phenol with a ligno-cellulose material in the presence of a small amount of concentrated sulphuric acid approximately 5% by weight of the said ligno-cellulose material and live steam at approximately 225 lbs. per square inch for a period of approximately 30 minutes, and washing and drying the resulting product.

2. A process of making a heat hardening quick curing resinoid which comprises, forming an intermediate product by reacting phenol with a ligno-cellulose material in the presence of a small amount of concentrated sulphuric acid approximately 5% by weight of the said ligno-cellulose material and live steam at approximately 225 lbs. per square inch for a period of approximately 30 minutes, and washing and drying said intermediate product, and thereafter reacting said intermediate product with approximately 2% of its weight of sodium hydroxide, 10% of its weight of phenol and 25% of its weight of an aqueous formaldehyde solution, while stirring and heating under reflux; and removing the water by vacuum distillation.

3. A process of making a molding compound which comprises; forming an intermediate product by reacting phenol with a ligno-cellulose material in the presence of a small amount of concentrated sulphuric acid approximately 5% by weight of the said ligno-cellulose material and live steam at approximately 225 lbs. per square inch for a period of approximately 30 minutes, washing and drying said intermediate product; thereafter forming a second intermediate product, by reacting said first intermediate product with approximately 2% of its weight of phenol and 25% of its weight of an aqueous formaldehyde solution, while stirring and heating under reflux, and removing the water by vacuum distillation; and finally mixing the second intermediate product with suitable fillers, hardening agents and plasticizers, compounding the mixture on hot rolls, and granulating the molding compound.

4. A process of making a molding compound which comprises; forming an intermediate product by reacting phenol with a ligno-cellulose material in the presence of a small amount of concentrated sulphuric acid approximately 5% by weight of the said ligno-cellulose material and steam at approximately 225 lbs. per square inch for a period of approximately 30 minutes, then washing and drying, thereafter mixing said intermediate product with neutralizing agents, hardening agents and fillers by dry grinding.

5. A process of making a molding compound for producing molded articles of high luster and water resistance which comprises, forming an intermediate product by reacting phenol with a ligno-cellulose material in the presence of a small amount of concentrated sulphuric acid approximately 5% by weight of the said ligno-cellulose material and steam at approximately 225 lbs. per square inch for a period of approximately 30 minutes, and washing and drying the intermediate product, thereafter mixing 100 parts by weight of said intermediate product with 6 parts by weight calcium hydroxide, 4 parts by weight of hexamethylenetetramine, lubricants, 25 parts by weight of long fibered pulp made by digesting bagasse with lime, and 100 parts by weight of a molding compound prepared by digesting bagasse for ½ hour at 125 lbs. per square inch steam pressure with 1% sulfuric acid; washing, drying, grinding and mixing with 8% each of aniline and furfural.

6. A process of making a molding compound of high strength which comprises; forming a first intermediate product by reacting phenol with a ligno-cellulose material in the presence of a small amount of concentrated sulphuric acid approximately 5% by weight of the said ligno-cellulose material and live steam at approximately 225 lbs. per square inch for a period of approximately 30 minutes, and washing and drying said first intermediate product; thereafter forming a second intermediate product by reacting said first intermediate product with approximately 2% of its weight of sodium hydroxide, 10% of its weight of phenol and 25% of its weight of an aqueous formaldehyde solution, while stirring and heating under reflux, and removing the water by vacuum distillation; thereafter compounding said second intermediate product on hot rolls with hardening agents and bagasse fiber prepared by digesting bagasse with lime and beating to separate the fibers, said compounding being carried on for a period of 2 to 7 minutes until uniformity is obtained, removing the composition from said rolls and grinding to any desired fineness.

7. A process of making a synthetic resin having a high degree of flow which comprises, forming an intermediate product by reacting phenol with a ligno-cellulose material in the presence of a small amount of concentrated sulphuric acid approximately 5% by weight of the said ligno-cellulose material and live steam at approximately 225 lbs per square inch for a period of approximately 30 minutes, and washing and drying said intermediate product, thereafter converting said intermediate product from a non-curing to a curing resin by neutralization and combination with additional aldehydic bodies and at the same time modified by the inclusion within its body of small amounts of slowly-curable or non-curable resins derived from the addition to said intermediate product of small amounts of ortho- and para-cresols in the form of cresylic acid together with sufficient formaldehyde to cause transformation thereof to these resins.

8. A process of making a heat-hardenable molding composition which comprises, forming a first intermediate product by reacting phenol with a ligno-cellulose material in the presence of a small amount of concentrated sulphuric acid approximately 5% by weight of the said ligno-cellulose material and live steam at approximately 225 lbs. per square inch for a period of approximately 30 minutes, and washing and drying said first intermediate product, thereafter forming a second intermediate product by converting said first intermediate product from a non-curing to a curing resin by neutralization and combination with additional aldehydic bodies and at the same time modified by the inclusion within its body of small amounts of slowly-curable or non-curable resins derived from the addition to said first intermediate product of small amounts of ortho- and para-cresols in the form of cresylic acid, together with sufficient formaldehyde to cause transformation thereof to these resins, thereafter compounding said second intermediate product with suitable fillers, hardening agents and plasticizers to form a product suitable for use in hot molding processes.

9. The product produced by the process of claim 1.

10. The product produced by the process of claim 2.

11. The product produced by the process of claim 3.

12. The product produced by the process of claim 4.

13. The product produced by the process of claim 5.

14. The product produced by the process of claim 6.

15. The product from claim 7.

16. The product produced by the process of claim 8.

17. Articles molded from the product of claim 8.

18. A process of making a synthetic resin of a type similar to phenol-aldehyde resins which comprises reacting phenol with a ligno-cellulose material in the presence of a small amount of concentrated sulphuric acid and steam at approximately 225 lbs. per square inch of pressure.

19. In the process of making a synthetic resin of the type similar to the phenol-aldehyde resins, the step of liberating aldehydes and ketones from ligno-cellulosic material by acid-hydrolysis in the presence of live steam under pressure and simultaneously reacting phenol with said liberated aldehydes and ketones under conditions favoring the formation of resin.

20. In the process of making a synthetic resin of the type similar to the phenol-aldehyde resins, the steps of liberating aldehydes and ketones from ligno-cellulosic material by heating said ligno-cellulosic material with substantially five percent of its weight of concentrated sulfuric acid in the presence of live steam under pressure of substantially 225 lbs. per square inch, and simultaneously reacting said liberated aldehydes and ketones with phenol subject to the same conditions of temperature and pressure as said aldehydes and ketones to form a resin.

THOMAS ROBERT McELHINNEY.